US009890871B2

United States Patent
Liang et al.

(10) Patent No.: US 9,890,871 B2
(45) Date of Patent: Feb. 13, 2018

(54) HIGH-POWER BI-DIRECTIONAL NON-RECOVERY SPRING MAGNETIC VALVE COMPRISING PERMANENT MAGNET

(71) Applicant: HARBIN INSTITUTE OF TECHNOLOGY, Heilongjiang (CN)

(72) Inventors: Huimin Liang, Heilongjiang (CN); Kun Zhang, Heilongjiang (CN); Jingbo Lin, Heilongjiang (CN); Haidan Yu, Heilongjiang (CN); Jie Deng, Heilongjiang (CN); Fan Zou, Heilongjiang (CN)

(73) Assignee: HARBIN INSTITUTE OF TECHNOLOGY, Heilongjiang Province (CN)

( * ) Notice: Subject to any disclaimer, the term of this patent is extended or adjusted under 35 U.S.C. 154(b) by 0 days.

(21) Appl. No.: 15/038,437

(22) PCT Filed: Apr. 10, 2015

(86) PCT No.: PCT/CN2015/000251
§ 371 (c)(1),
(2) Date: May 20, 2016

(87) PCT Pub. No.: WO2015/184791
PCT Pub. Date: Dec. 10, 2015

(65) Prior Publication Data
US 2017/0074418 A1 Mar. 16, 2017

(30) Foreign Application Priority Data

Jun. 3, 2014 (CN) .......................... 2014 1 0242181

(51) Int. Cl.
*H01F 7/16* (2006.01)
*H01F 7/122* (2006.01)
(Continued)

(52) U.S. Cl.
CPC ........ *F16K 31/082* (2013.01); *F16K 31/0679* (2013.01); *F16K 31/08* (2013.01);
(Continued)

(58) Field of Classification Search
CPC .... F16K 31/0679; F16K 31/082; H01F 7/122; H01F 7/1615; H01F 2007/1692
(Continued)

(56) References Cited

U.S. PATENT DOCUMENTS 4,004,258 A 1/1977 Arnold

FOREIGN PATENT DOCUMENTS

| CN | 2456280 Y | 10/2001 |
|---|---|---|
| CN | 201177092 Y | 1/2009 |

(Continued)

OTHER PUBLICATIONS

International Search Report for PCT/CN2015/000251.

*Primary Examiner* — Ramon M Barrera
(74) *Attorney, Agent, or Firm* — The PL Law Group, PLLC (57) ABSTRACT

A high-power bi-directional non-recovery spring magnetic valve including permanent magnets has an upper magnetic circuit part and lower magnetic circuit part symmetrically disposed and connected together via an armature connection rod and a housing connection ring, the upper magnetic circuit part comprises an upper iron core, an upper housing, an upper coil, an upper annular permanent magnet, an upper yoke iron and an upper push rod, the lower magnetic circuit part comprises a lower iron core, a lower housing, a lower coil, a lower annular permanent magnet, a lower yoke iron and a lower push rod. The magnetic valve comprising permanent magnets realizes bistable-state magnetic retaining, and has an adjustable retaining force for permanent magnet adjustment, quick response, and high output force.

5 Claims, 7 Drawing Sheets

(51) Int. Cl.

| | |
|---|---|
| *F16K 31/08* | (2006.01) |
| *F16K 31/06* | (2006.01) |
| *H01F 7/06* | (2006.01) |
| *H01F 7/08* | (2006.01) |
| *H01F 27/02* | (2006.01) |
| *H01F 27/24* | (2006.01) |
| *H01F 27/28* | (2006.01) |
| *H01F 27/32* | (2006.01) |

(52) U.S. Cl.
CPC ............ *H01F 7/064* (2013.01); *H01F 7/081* (2013.01); *H01F 7/122* (2013.01); *H01F 7/16* (2013.01); *H01F 7/1615* (2013.01); *H01F 27/02* (2013.01); *H01F 27/24* (2013.01); *H01F 27/28* (2013.01); *H01F 27/325* (2013.01); *H01F 2007/086* (2013.01); *H01F 2007/1692* (2013.01)

(58) Field of Classification Search
USPC .......................................... 335/229–234, 267
See application file for complete search history.

(56) References Cited

FOREIGN PATENT DOCUMENTS

| DE | 19836516 A1 | 2/1999 |
|---|---|---|
| EP | 1010866 A2 | 6/2000 |
| JP | 2004076807 A | 3/2004 |

FIG. 7

HIGH-POWER BI-DIRECTIONAL NON-RECOVERY SPRING MAGNETIC VALVE COMPRISING PERMANENT MAGNET

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/CN2015/000251, filed Apr. 10, 2015, which claims priority to the benefit of Chinese Patent Application No. 201410242181.9 filed in the China Intellectual Property Office on Jun. 3, 2014, the entire contents of which are incorporated herein by reference.

TECHNICAL FIELD

The present invention relates to a high-power bi-directional no-recovery spring electromagnetic valve with a permanent magnet and belongs to the field of electromagnetic valves. The electromagnetic valve with a permanent magnet specifically refers to an electromagnetic valve comprising a permanent magnet arranged inside.

BACKGROUND OF THE INVENTION

The electromagnetic valve is an industrial device for carrying out electromagnetic control, and is a basic automation element for fluid control. The electromagnetic valve belongs to actuators and is not limited to a hydraulic or pneumatic actuator. The electromagnetic valve is used in an industrial control system for adjusting direction, flow and speed of a medium as well as other parameters. Desired control may be accomplished by cooperating the electromagnetic valve with different circuits, so as to ensure both the precision and the flexibility of the desired control. There are many kinds of electromagnetic valves, and different electromagnetic valves function at different positions in the control system. The most frequently-used electromagnetic valves are one-way valves, safety valves, directional control valves, and speed regulating valves, etc.

However, traditional electromagnetic valves have disadvantages of a slow response time, a low output force and the like, thus cannot meet industrial production demands under specific circumstances.

SUMMARY

The present invention aims to solve the problem that a prior art device which produces radially and azimuthally polarized light is complicated in structure and high in cost by providing a high-power bi-directional no-recovery spring electromagnetic valve with a permanent magnet.

the present invention discloses a high-power bi-directional no-recovery spring electromagnetic valve with a permanent magnet; wherein, the electromagnetic valve comprises an upper magnetic circuit part, a lower magnetic circuit part, an armature connection rod 7 and a housing connection ring 14; wherein, the upper and lower magnetic circuit parts are symmetrically disposed, and are connected together via the armature connection rod 7 and the housing connection ring 14;

the upper magnetic circuit part comprises an upper iron core 8, an upper housing 9, an upper coil 10, an upper annular permanent magnet 11, an upper yoke iron 12 and an upper push rod 13; the upper housing 9 is a cylinder with an upwardly oriented opening; the upper yoke iron 12 is provided on an upper opening of the upper housing 9; and a center hole of the upper yoke iron 12 is used for accommodating the upper push rod 13 to make an up-and-down movement; the upper push rod 13 is positioned at an upper end of the upper iron core 8; and a center hole of a bottom of the upper housing 9 is used for accommodating the upper iron core 8 to make an up-and-down movement; the upper annular permanent magnet 11 is provided on an inner side wall of the upper housing 9; and the upper coil 10 is positioned between the upper annular permanent magnet 11 and the bottom of the upper housing 9; an air gap exists between an inner hole of the upper annular permanent magnet 11 and an outer surface of the upper iron core 8; and an air gap exists between an inner surface of the center hole of the bottom of the upper housing 9 and the outer surface of the upper iron core 8;

the lower magnetic circuit part comprises a lower iron core 6, a lower housing 5, a lower coil 4, a lower annular permanent magnet 3, a lower yoke iron 2 and a lower push rod 1; the lower housing 5 is a cylinder with a downwardly oriented opening; the lower yoke iron 2 is provided on a lower opening of the lower housing 5; and a center hole of the lower yoke iron 2 is used for accommodating the lower push rod 1 to make an up-and-down movement; the lower push rod 1 is positioned at a lower end of the lower iron core 6; and a center hole of a top of the lower housing 5 is used for accommodating the lower iron core 6 to make an up-and-down movement; the lower annular permanent magnet 3 is provided on an inner side wall of the lower housing 5; and the lower coil 4 is positioned between the lower annular permanent magnet 3 and the top of the lower housing 5; an air gap exists between an inner hole of the lower annular permanent magnet 3 and an outer surface of the lower iron core 6; and an air gap exists between an inner surface of the center hole of the top of the lower housing 5 and the outer surface of the lower iron core 6;

a lower end of the upper iron core 8 and an upper end of the lower iron core 6 are fixed together via the armature connection rod 7;

the upper housing 9 and the lower housing 5 are connected together via the housing connection ring 14; and an upper circular ring of the housing connection ring 14 is fixedly connected with an edge of the center hole of the bottom of the upper housing 9; and a lower circular ring of the housing connection ring 14 is fixedly connected with an edge of the center hole of the lower housing 5.

The present invention has the following advantages that: the high-power bi-directional no-recovery spring electromagnetic valve with a permanent magnet is symmetrical in structure and simple to assemble; the electromagnetic valve is a bi-stable magnetic latching valve, has a adjustable permanent magnet to change a holding force, and may be configured in a flexible manner by being cooperated with different counterforce designs; and the electromagnetic valve has a lower activation condition, is smaller in pull-in (drop-out) ampere turns, has a smaller power and has the characteristics of a faster response time and a higher output force.

The permanent magnet is away from regions where main contacts and an arc extinguish chamber are located; thus adverse effects of high temperatures on the permanent magnet may be reduced. Meanwhile, this structure has good vibration-resistance; the actual assembly is more effective;

the uniformity of products from the same batch is enhanced; and the rejection rate of batch products is reduced.

DETAILED DESCRIPTION OF THE EMBODIMENTS

Embodiment 1

Figure 1:
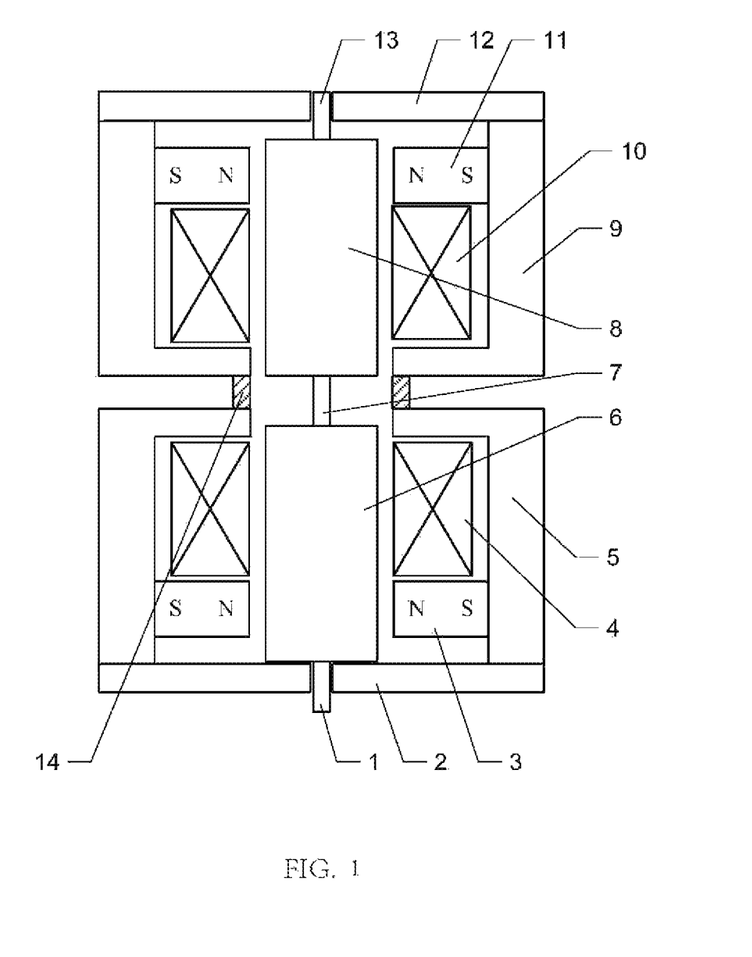
FIG. 1 is a structural schematic view of a high-power bi-directional no-recovery spring electromagnetic valve with a permanent magnet of the present invention.

This embodiment will be explained below with reference to FIGS. 1 to 7. A high-power bi-directional no-recovery spring electromagnetic valve with a permanent magnet of this embodiment comprises an upper magnetic circuit part, a lower magnetic circuit part, an armature connection rod 7 and a housing connection ring 14; wherein, the upper magnetic circuit part and the lower magnetic circuit part are symmetrically disposed, and are connected together via the armature connection rod 7 and the housing connection ring 14;

the upper magnetic circuit part comprises an upper iron core 8, an upper housing 9, an upper coil 10, an upper annular permanent magnet 11, an upper yoke iron 12 and an upper push rod 13; the upper housing 9 is a cylinder with an upwardly oriented opening; the upper yoke iron 12 is provided on an upper opening of the upper housing 9; and a center hole of the upper yoke iron 12 is used for accommodating the upper push rod 13 to make an up-and-down movement; the upper push rod 13 is positioned at an upper end of the upper iron core 8; and a center hole of a bottom of the upper housing 9 is used for accommodating the upper iron core 8 to make an up-and-down movement; the upper annular permanent magnet 11 is provided on an inner side wall of the upper housing 9; and the upper coil 10 is positioned between the upper annular permanent magnet 11 and the bottom of the upper housing 9; an air gap exists between an inner hole of the upper annular permanent magnet 11 and an outer surface of the upper iron core 8; and an air gap exists between an inner surface of the center hole of the bottom of the upper housing 9 and the outer surface of the upper iron core 8;

the lower magnetic circuit part comprises a lower iron core 6, a lower housing 5, a lower coil 4, a lower annular permanent magnet 3, a lower yoke iron 2 and a lower push rod 1; the lower housing 5 is a cylinder with a downwardly oriented opening; the lower yoke iron 2 is provided on a lower opening of the lower housing 5; and a center hole of the lower yoke iron 2 is used for accommodating the lower push rod 1 to make an up-and-down movement; the lower push rod 1 is positioned at a lower end of the lower iron core 6; and a center hole of a top of the lower housing 5 is used for accommodating the lower iron core 6 to make an up-and-down movement; the lower annular permanent magnet 3 is provided on an inner side wall of the lower housing 5; and the lower coil 4 is positioned between the lower annular permanent magnet 3 and the top of the lower housing 5; an air gap exists between an inner hole of the lower annular permanent magnet 3 and an outer surface of the lower iron core 6; and an air gap exists between an inner surface of the center hole of the top of the lower housing 5 and the outer surface of the lower iron core 6;

a lower end of the upper iron core 8 and an upper end of the lower iron core 6 are fixed together via the armature connection rod 7;

the upper housing 9 and the lower housing 5 are connected together via the housing connection ring 14; and an upper circular ring of the housing connection ring 14 is fixedly connected with an edge of the center hole of the bottom of the upper housing 9; and a lower circular ring of the housing connection ring 14 is fixedly connected with an edge of the center hole of the lower housing 5.

The upper push rod 13, the upper iron core 8, the armature connection rod 7, an lower iron core 6 and the lower push rod 1 constitute movable parts. When the movable parts move upwards, the upper push rod 13 projects upwardly from a center hole of the upper yoke iron 12; and the movable parts keep moving upwards until an upper end of the upper iron core 8 comes into contact with the upper yoke iron 12. When the movable parts move downwards, the lower push rod 1 projects downwardly from the center hole of the lower yoke iron 2; and the movable parts keep moving downwards until the lower end of the lower iron core 6 comes into contact with the lower yoke iron 2.

The upper magnetic circuit part and the lower magnetic circuit part are mirror symmetric in structure.

The upper annular permanent magnet 11 and the lower annular permanent magnet 3 are both magnetized in a radial direction, and have the same magnetizing direction.

The upper iron core 8, the lower iron core 6, the upper yoke iron 12, the lower yoke iron 2, the upper housing 9 and the lower housing 5 are all made of materials with a high magnetic permeability.

The upper iron core 8 and the lower iron core 6 are cylindrical, and their longitudinal sections are rectangular.

The upper coil 10 and the lower coil 4 are both implemented by being wound on a coil bobbin.

With reference to FIG. 1, suppose that N is inside and S is outside for both the upper annular permanent magnet 11 and the lower annular permanent magnet 3, and operation processes of the upper annular permanent magnet 11 and the lower annular permanent magnet 3 will be explained in detail below.

Figure 2:
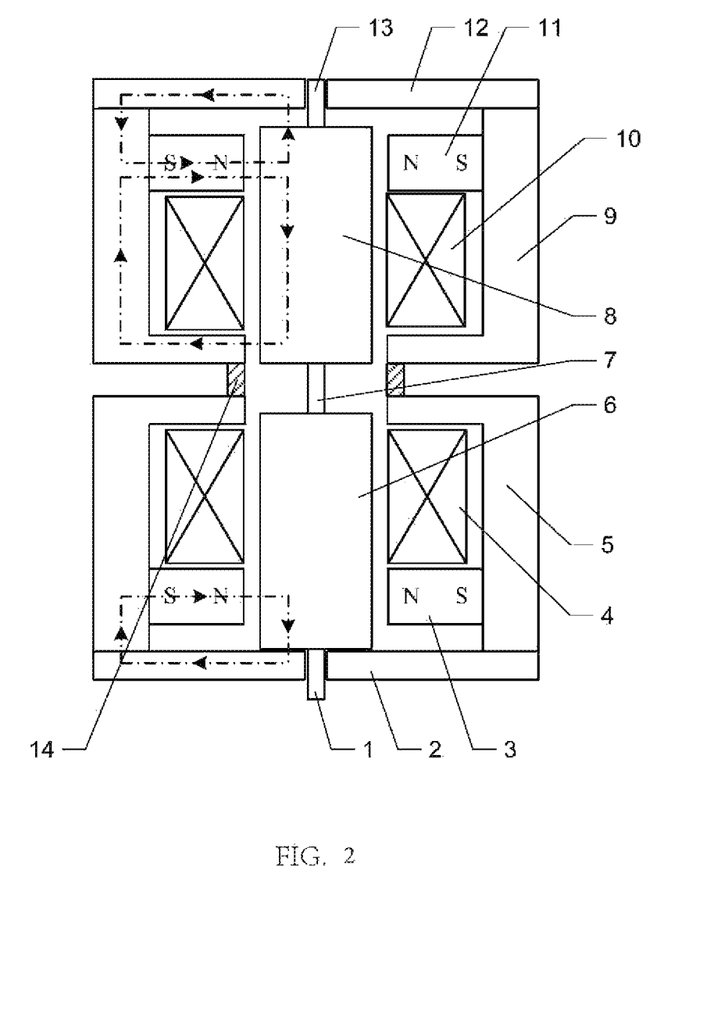
FIG. 2 is a view of a magnetic flux path of an upper coil and a lower coil when they are not energized; at this moment they are in an initial position.

FIG. 2 shows that both the upper coil 10 and the lower coil 4 are in a un-energized state while they are in an initial position. A lower end surface of the lower iron core 6 presses against and comes into contact with the lower yoke iron 2 under gravity, and the contact therebetween is nearly void-free. As a magnetic flux only passes through positions of minimum reluctance, there exists only one permanent magnetic flux path in the lower magnetic circuit part: a N-pole of the lower annular permanent magnet 3→the lower iron core 6→the lower yoke iron 2→the lower housing 5→an S-pole of the lower annular permanent magnet 3→the N-pole of the lower annular permanent magnet 3, and the movable parts are kept at the initial position shown in FIG. 1 by an attraction force between the lower annular permanent magnet 3 and the lower iron core 6. There exist two parallel permanent magnetic flux paths in the upper magnetic circuit part, the first permanent magnetic flux path being: a N-pole of the upper annular permanent magnet 11→the upper iron core 8→an air gap between the upper iron core 8 and the upper yoke iron 12→the upper yoke iron 12→the upper housing 9→an S-pole of the upper annular permanent magnet 11→the N-pole of the upper annular permanent magnet 11; while the second permanent magnetic flux path being: the N-pole of the upper annular permanent magnet 11→the upper iron core 8→an air gap between the upper iron core 8 and the upper housing 9→the upper housing 9→the S-pole of the upper annular permanent magnet 11→the N-pole of the upper annular permanent magnet 11.

Figure 3:
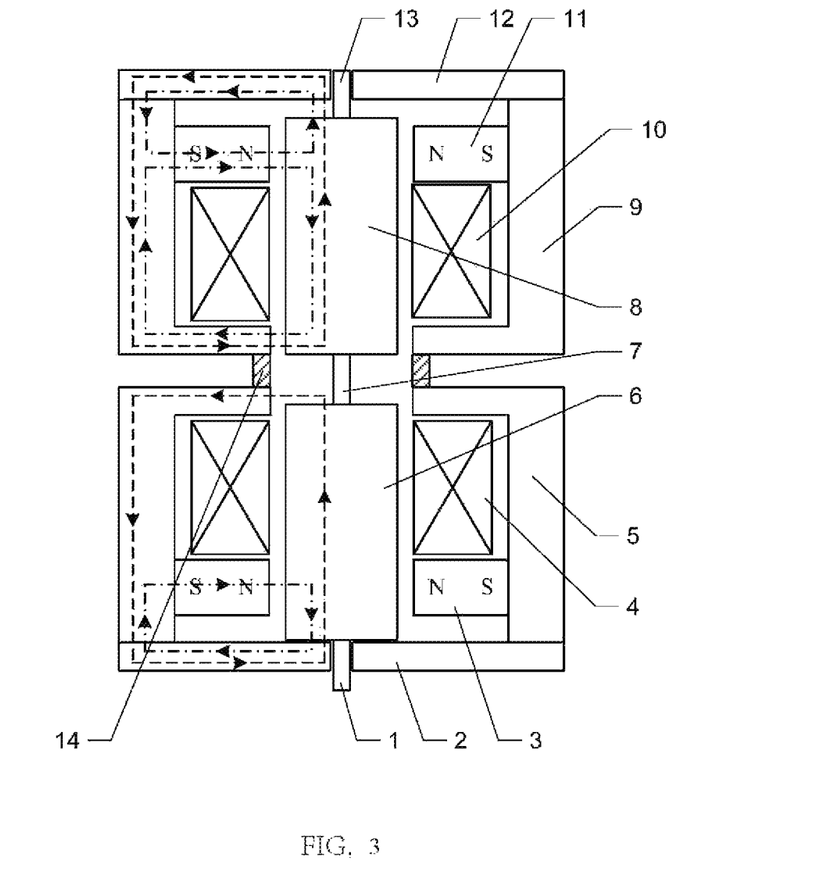
FIG. 3 is a view of a magnetic flux path of the upper coil and the lower coil when they are energized forwardly at an initial time.
Figure 4:
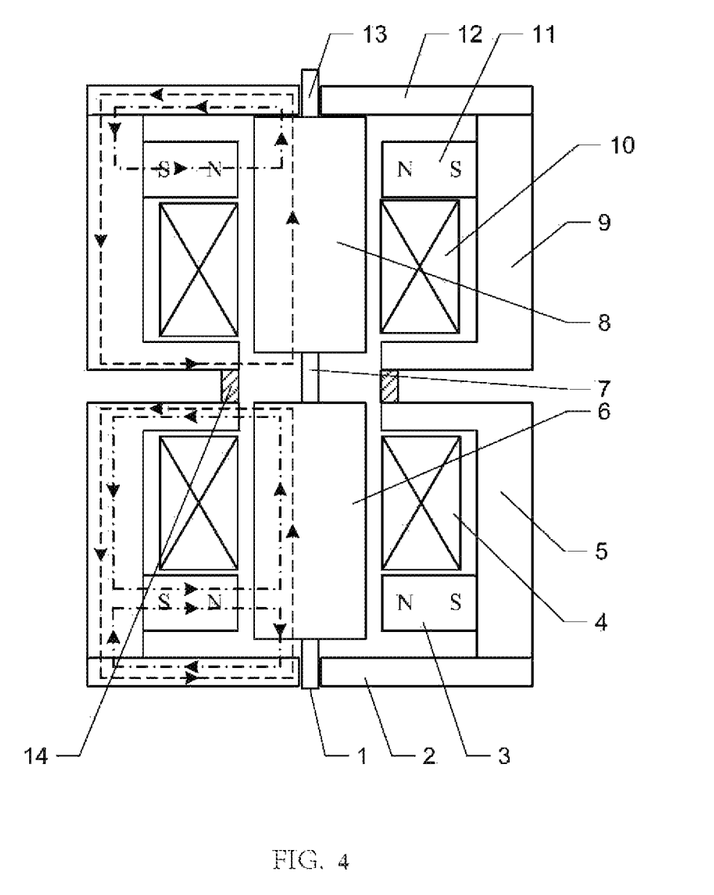
FIG. 4 is a view of a magnetic flux path of the upper coil and the lower coil after they are energized forwardly until they accomplish a bottom-up movement; at this moment they are in the position after the bottom-up movement.
Figure 5:
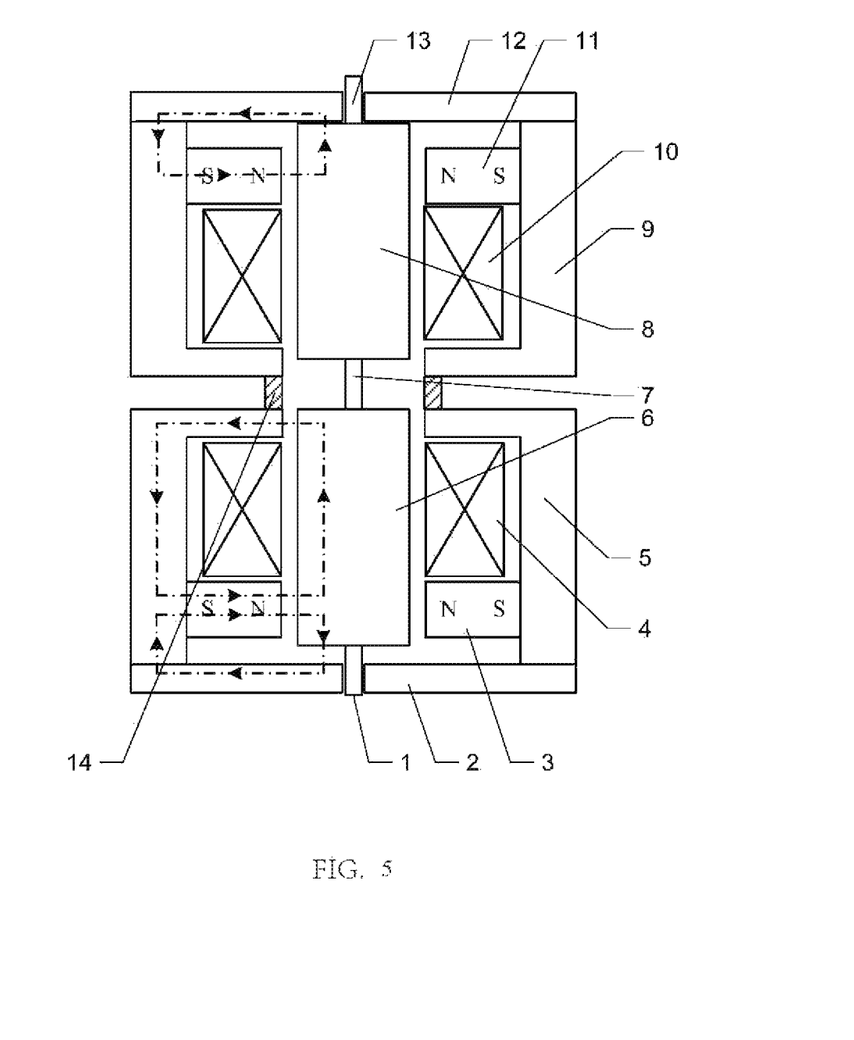
FIG. 5 is a view of a magnetic flux path of the upper coil and the lower coil when they are de-energized.

FIG. 3 shows a state when the upper coil 10 and the lower coil 4 are energized forwardly at the same time. When a forward energization is applied, an electromagnetic flux in a direction as shown in FIG. 3 is generated, and an electromagnetic flux path generated by the lower coil 4 is: the lower iron core 6→the lower housing 5→the lower yoke iron 2→the lower iron core 6. Wherein the electromagnetic flux generated by the lower coil 4 is opposite in direction to a lower permanent magnetic flux in the lower iron core 6. Therefore, the electromagnetic flux generated by the lower coil 4 may weaken a resultant lower permanent magnetic flux constantly. That is, an initially downward resultant magnetic flux in the lower iron core 6 becomes weaker and weaker until finally becomes 0, then the process is reversed, that is, the resultant magnetic flux turns to be upward. An electromagnetic flux path generated by the upper coil 10 is: the upper iron core 8→an air gap between the upper iron core 8 and the upper yoke iron 12→the upper yoke iron 12→the upper housing 9→an air gap between the upper housing 9 and the upper iron core 8→the upper iron core 8. Wherein, an electromagnetic flux generated by the upper coil 10 in the upper iron core is in the same direction as the first permanent magnetic flux path but in an opposite direction to the second permanent magnetic flux path. The electromagnetic flux by the upper coil 10 superposes with the first permanent magnetic flux, thus the upward magnetic flux is enhanced, while the second permanent magnetic flux is weakened by the electromagnetic flux by the upper coil 10. When a resultant force resulting from a combination of the resultant magnetic flux in the lower iron core 6 and the resultant magnetic flux in the upper iron core 8 is directed upward, the movable parts start to move upwards until the upper end surface of the upper iron core 8 abuts against a lower surface of the upper yoke iron 12, as shown in FIG. 4, thereby a bottom-up movement is accomplished. The state shown in FIG. 4 will be maintained as long as the forward energization is applied. In the position as shown in FIG. 4, the upper magnetic circuit part has only one permanent magnetic flux path, and the lower magnetic circuit part has two parallel permanent magnetic fluxes.

At this time, if both the upper coil 10 and the lower coil 4 are de-energized at the same time, two electromagnetic fluxes generated by the upper coil 10 and the lower coil 4 will disappear. See FIG. 5, there is only one permanent magnetic flux path left in the upper magnetic circuit part: the N-pole of the upper annular permanent magnet 11→the upper iron core 8→the upper yoke iron 12→the upper housing 9→the S-pole of the upper annular permanent magnet 11→the N-pole of the upper annular permanent magnet 11. The attraction force between the upper iron core 8 and the upper annular permanent magnet 11 keeps the upper iron core 8 in the position at this moment. There are two parallel permanent magnetic flux paths in the lower magnetic circuit part. The first permanent magnetic flux path is: a N-pole of the lower annular permanent magnet 3→the lower iron core 6→an air gap between the lower iron core 6 and the lower yoke iron 2→the lower yoke iron 2→the lower housing 5→an S-pole of the lower annular permanent magnet 3→the N-pole of the lower annular permanent magnet 3. And, the second permanent magnetic flux path is: the N-pole of the lower annular permanent magnet 3→the lower iron core 6→an air gap between the lower iron core 6 and the lower housing 5→the lower housing 5→the S-pole of the lower annular permanent magnet 3→the N-pole of the lower annular permanent magnet 3. The above two permanent magnetic fluxes in the lower iron core 6 have opposite directions, but a resultant magnetic flux resulting from a combination of the above two permanent magnetic fluxes may be smaller than the magnetic flux in the upper iron core 8, and therefore the movable parts do not change their position.

Figure 6:
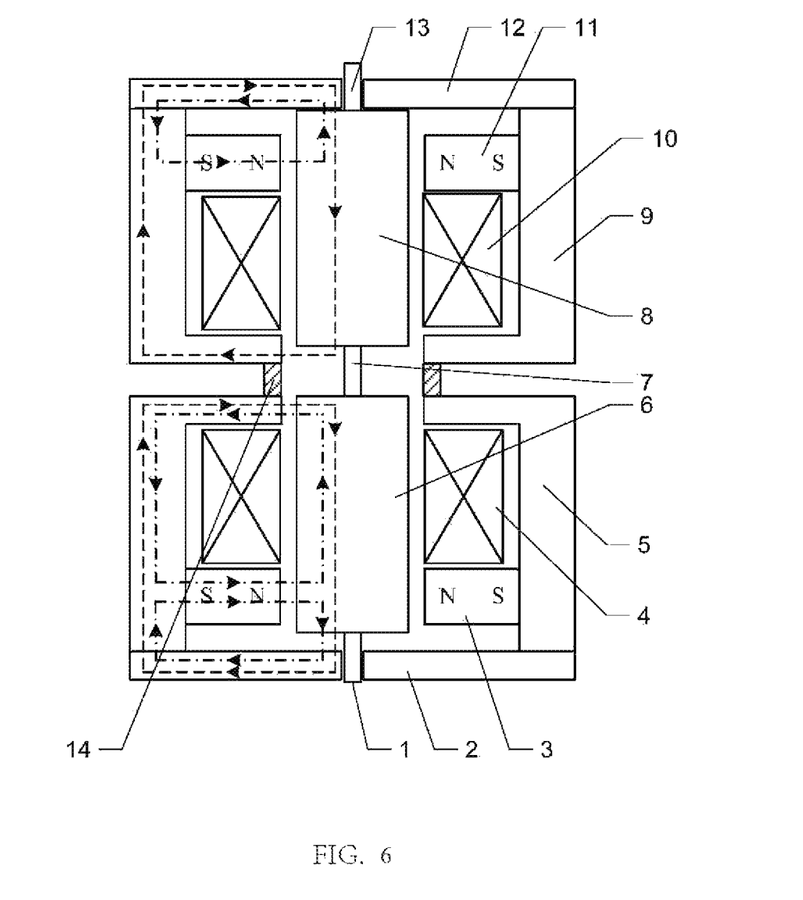
FIG. 6 is a view of a magnetic flux path of the upper coil and the lower coil when they are energized reversely at an initial time.
Figure 7:
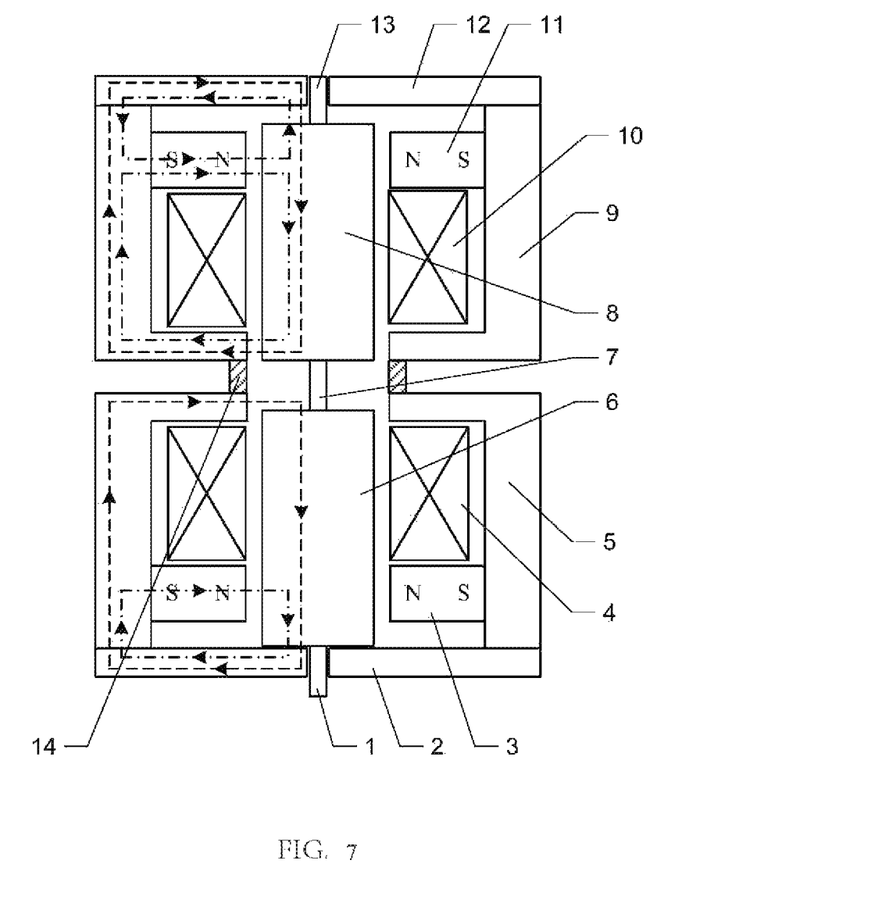
FIG. 7 is a view of a magnetic flux path of the upper coil and the lower coil after they are energized reversely until they accomplish a top-down movement; at this moment they return to the initial position.

At this time, if both the upper coil 10 and the lower coil 4 are energized reversely at the same time, an electromagnetic flux as shown in FIG. 6 will be generated, and will be opposite in direction to the electromagnetic flux as shown in FIG. 4 generated by applying the forward energization. The electromagnetic flux in the upper magnetic circuit part weakens the upper permanent magnetic flux. And the electromagnetic flux in the lower magnetic circuit part superposes with the first permanent magnetic flux, enhances it, and weakens the second permanent magnetic flux. And thus the resultant force resulting from a combination of the above two permanent magnetic fluxes keeps moving downwards. The specific process is opposite to the aforementioned process when the forward energization is applied. The movable parts begin to move downwards when the resultant force is directed downwards until the lower end surface of the lower iron core 6 presses against the lower yoke iron 2, thereby accomplishing a top-down movement, as shown in FIG. 7.

When in different states of energization and de-energization, and when operations may be carried out according to the magnetic circuits shown in FIGS. 2 to 7, the permanent magnets (that is, the upper annular permanent magnet 11 and the lower annular permanent magnet 3) provide a holding force under stable states; the iron cores (that is, the lower iron core 6 and the upper iron core 8) are devices for undertaking on-off actions; and the yoke irons (the upper yoke iron 12 and the lower yoke iron 2) are devices for limiting the position of the armature. An entire electromagnetic valve magnetic circuit is associated with the permanent magnets, the iron cores, and the yoke irons. And the entire electromagnetic valve magnetic circuit connecting other devices such as the coils determines the overall performance of the electromagnetic valve with a permanent magnet. The magnetic circuit and its corresponding structural designs may greatly increase the utilization efficiency of the permanent magnet. The magnetic circuit is effective in magnetic flux confinement, and is simple in structure. The actual assembly of products is more effective; the uniformity of products from the same batch is enhanced; and the rejection rate of batch products is reduced.

What is claimed is:

1. A high-power bi-directional no-recovery spring electromagnetic valve with a permanent magnet, the electromagnetic valve comprising an upper magnetic circuit part, a lower magnetic circuit part, an armature connection rod and a housing connection ring, wherein, the upper magnetic circuit part and the lower magnetic circuit part are symmetrically disposed, and are connected together via the armature connection rod and the housing connection ring;

the upper magnetic circuit part comprises an upper iron core, an upper housing, an upper coil, an upper annular permanent magnet, an upper yoke iron and an upper push rod, wherein the upper housing is a cylinder with an upwardly oriented opening;

the upper yoke iron is provided on an upper opening of the upper housing, and a center hole of the upper yoke iron is used for accommodating the upper push rod to make an up-and-down movement;

the upper push rod is positioned at an upper end of the upper iron core, and a center hole of a bottom of the upper housing is used for accommodating the upper iron core to make an up-and-down movement;

the upper annular permanent magnet is provided on an inner side wall of the upper housing; and the upper coil is positioned between the upper annular permanent magnet and the bottom of the upper housing, an air gap exists between an inner hole of the upper annular permanent magnet and an outer surface of the upper iron core, and an air gap exists between an inner surface of the center hole of the bottom of the upper housing and the outer surface of the upper iron core;

the lower magnetic circuit part comprises a lower iron core, a lower housing, a lower coil, a lower annular permanent magnet, a lower yoke iron and a lower push rod, wherein the lower housing is a cylinder with a downwardly oriented opening;

the lower yoke iron is provided on a lower opening of the lower housing, and a center hole of the lower yoke iron is used for accommodating the lower push rod to make an up-and-down movement;

the lower push rod is positioned at a lower end of the lower iron core, and a center hole of a top of the lower housing is used for accommodating the lower iron core to make an up-and-down movement, the lower annular permanent magnet is provided on an inner side wall of the lower housing; and the lower coil is positioned between the lower annular permanent magnet and the top of the lower housing, an air gap exists between an inner hole of the lower annular permanent magnet and an outer surface of the lower iron core, and an air gap exists between an inner surface of the center hole of the top of the lower housing and the outer surface of the lower iron core a lower end of the upper iron core and an upper end of the lower iron core are fixed together via the armature connection rod;

the upper housing and the lower housing are connected together via the housing connection ring; and an upper circular ring of the housing connection ring is fixedly connected with an edge of the center hole of the bottom of the upper housing, and a lower circular ring of the housing connection ring is fixedly connected with an edge of the center hole of the lower housing.

2. The high-power bi-directional no-recovery spring electromagnetic valve with a permanent magnet according to claim 1, wherein, the upper annular permanent magnet and the lower annular permanent magnet are both magnetized in a radial direction, and have the same magnetizing direction.

3. The high-power bi-directional no-recovery spring electromagnetic valve with a permanent magnet according to claim 1, wherein, the upper iron core, the lower iron core, the upper yoke iron, the lower yoke iron, the upper housing and the lower housing are all made of materials with a high magnetic permeability.

4. The high-power bi-directional no-recovery spring electromagnetic valve with a permanent magnet according to claim 1, wherein, the upper iron core and the lower iron core are cylindrical, and their longitudinal sections are rectangular.

5. The high-power bi-directional no-recovery spring electromagnetic valve with a permanent magnet according to claim 1, wherein, the upper coil and the lower coil are both implemented by being wound on a coil bobbin.

* * * * *